(12) United States Patent
Marhfoul et al.

(10) Patent No.: US 9,535,183 B2
(45) Date of Patent: Jan. 3, 2017

(54) VERTICAL SEISMIC PROFILING-COMMON MIDPOINT GATHERS (VSP-CMP) BY WAVEFIELD EXTRAPOLATION

(71) Applicant: Saudi Arabian Oil Company, Dhahran (SA)

(72) Inventors: Bouchaib El Marhfoul, Dhahran (SA); John Cobbina Owusu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 636 days.

(21) Appl. No.: 13/793,656

(22) Filed: Mar. 11, 2013

(65) Prior Publication Data

US 2014/0254320 A1    Sep. 11, 2014

(51) Int. Cl.
*G01V 1/48* (2006.01)
*G01V 1/42* (2006.01)

(52) U.S. Cl.
CPC . *G01V 1/48* (2013.01); *G01V 1/42* (2013.01); *G01V 2210/161* (2013.01); *G01V 2210/675* (2013.01)

(58) Field of Classification Search
CPC ...... G01V 1/48; G01V 1/42; G01V 2210/161; G01V 2210/675
USPC ......................................................... 367/57
See application file for complete search history.

(56) References Cited

U.S. PATENT DOCUMENTS

| | | | |
|---|---|---|---|
| 5,051,961 A | 9/1991 | Corrigan et al. | |
| 5,471,435 A | 11/1995 | Marschall | |
| 5,757,723 A | 5/1998 | Weglein et al. | |
| 6,101,448 A | 8/2000 | Ikelle et al. | |
| 7,508,733 B2 | 3/2009 | Haldorsen | |
| 8,208,341 B2 | 6/2012 | Haldorsen et al. | |
| 2002/0053430 A1* | 5/2002 | Curtis et al. | 166/250.01 |

FOREIGN PATENT DOCUMENTS

WO    2012058257 A2    5/2012

OTHER PUBLICATIONS

Haldorsen et al., "Multichannel Wiener deconvolution of vertical seismic profiles", Geophysics, Oct. 1994, pp. 1500-1511, vol. 59, No. 10, Society of Exploration Geophysicists.

(Continued)

*Primary Examiner* — Daniel L Murphy
(74) *Attorney, Agent, or Firm* — Bracewell LLP; Constance G. Rhebergen; Albert B. Kimball, Jr.

(57) ABSTRACT

Direct arrivals from walkaway vertical seismic profiling or VSP survey data are used to derive Green's functions representing the seismic wave amplitude and travel time information required to extrapolate the vertical seismic profiling survey data from individual wellbore receivers to the individual source locations. The derived Green's functions are employed in a convolution process with upcoming primary wavefields from the VSP survey data for other surface locations. The derived Green's functions are also used in a correlation process with downgoing wavefields from the VSP survey data to extend lateral coverage of the VSP image. The sets of VSP-CMP gathers so formed are then processed to obtain information about the subsurface formations.

24 Claims, 3 Drawing Sheets

(56) References Cited

OTHER PUBLICATIONS

Dahl et al., "Surface Seismic Imaging with VSP Green's Function", EAGE 69th Conference & Exhibition, Jun. 11-14, 2007, pp. 1-5, Paper No. H012, European Association of Geoscientists & Engineers.
Chiburis et al., "Hydrocarbon Detection With AVO", Oilfield Review, Jan. 1993, vol. 5, pp. 42-50, No. 1, Seismics.
Marhfoul et al., "VSP Imaging by Wave-field Extrapolation Technique", Borehole Geophysics Workshop-Emphasis on 3D VSP Jan. 16-19, 2011, Instanbul, Turkey, pp. 1-3, European Association of Geoscientists & Engineers.
Ahmad et al., "Pre-stack VSP Elastic Inversion for Lithology Delineation in an Offshore Field of the Arabian Gulf, Saudi Arabia", Borehole Geophysics Workshop-Emphasis on 3D VSP Jan. 16-19, 2011, Istanbul, Turkey, pp. 1-5, European Association of Geoscientists & Engineers.
International Search Report with Written Opinion issued in related PCT Patent Application No. PCT/US2014/021882; dated Jul. 8, 2014; 11 pages.
Gerard T. Schuster, "Seismic Interferometry," Cambridge University Press, May 29, 2008, 280 pages.
Kees Wapenaar et al., "Tutorial on seismic interferometry: Part 1—Basic principles and applications," Geophysics, Society of Exploration Geophysicists, vol. 75, No. 5, Sep.-Oct. 2010; 15 pages.

\* cited by examiner

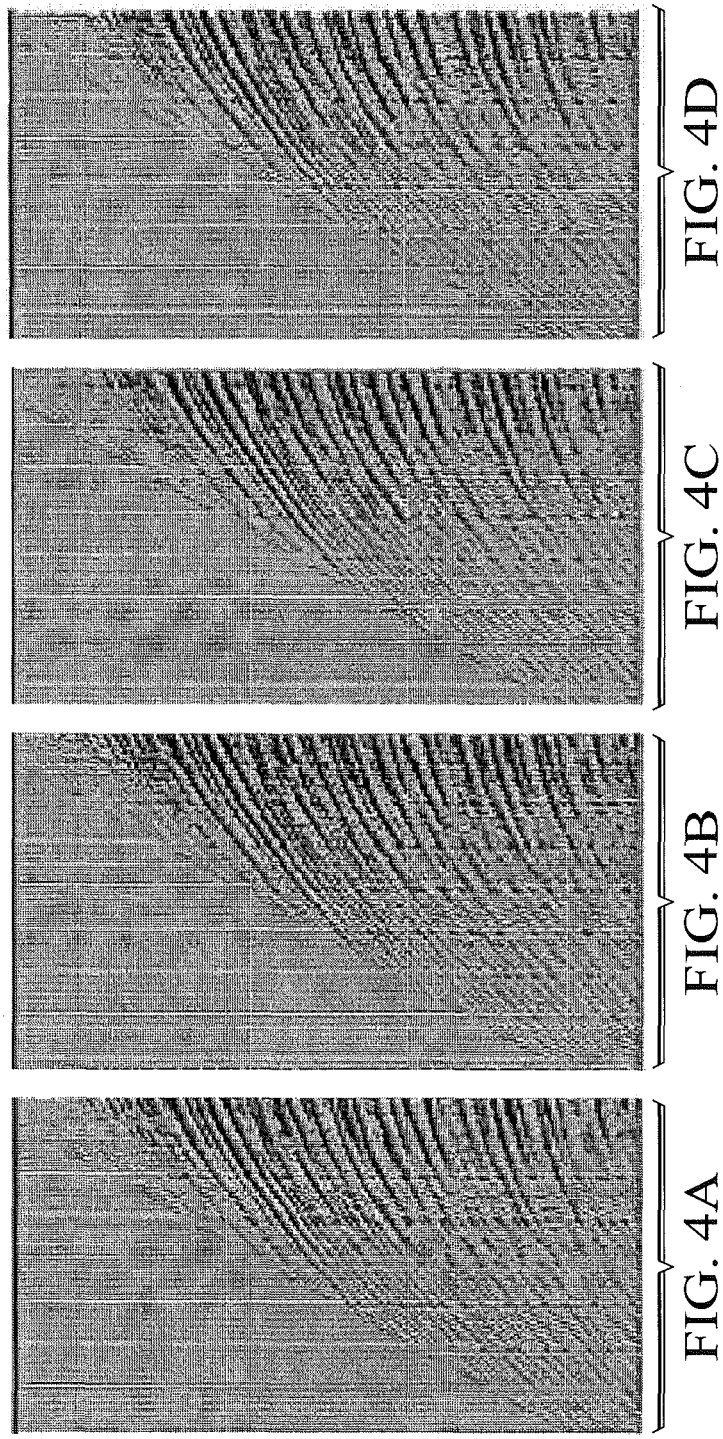

VERTICAL SEISMIC PROFILING-COMMON MIDPOINT GATHERS (VSP-CMP) BY WAVEFIELD EXTRAPOLATION

BACKGROUND OF THE INVENTION

1. Field of the Invention

The present invention relates to vertical seismic profiling (also known as VSP) data processing for analysis of subsurface formation structure, and in particular to computerized processing to generate vertical seismic profiling-common image gathers (also known as VSP-CMP) by wavefield extrapolation.

2. Description of the Related Art

Vertical seismic profiling has been used for detailed reservoir characterization. Vertical seismic profiling is based on seismic measurements from seismic sensors or geophones located in wellbores in response to seismic energy transmitted by sources from planned locations located on the surface. In vertical seismic profiling, the sensors in the wellbore are placed more closely than is the practice when surface seismic surveys are performed, with sensors at the earth's surface. Due to the closer sensor spacing in vertical seismic profiling, greater resolution detail is made available in the seismic data in order to analyze and characterize the reservoir.

However, so far as is known, the pre-stack elastic inversion and time-domain imaging methodologies available for vertical seismic profiling survey data have not been as fully developed as those available for surface seismic survey data. Consequently, the full extent of information present in vertical seismic profiling data has not been made available for analysis and evaluation of subsurface structure and formations.

SUMMARY OF THE INVENTION

Briefly, the present invention provides a new and improved computer implemented method for generating vertical seismic profiling-common image gathers (VSP-CMP) gathers for pre-stack elastic inversion and time-domain imaging of the vertical seismic profiling survey data in the form of responses sensed by receivers in a wellbore to seismic energy travelling through subsurface earth formations from seismic sources at surface locations on the surface. In the computer implemented process, the vertical seismic profiling survey data are assembled in the computer to form records for the individual wellbore receivers of the responses of the subsurface earth formations: to direct arrivals of seismic energy from the surface locations to the individual wellbore receivers, to upgoing wavefields of the seismic energy from the surface locations, and to downgoing wavefields of the seismic energy from the surface locations.

A measured VSP Green's function is derived in the computer from the direct arrivals of seismic energy in the vertical seismic profiling survey for individual surface locations and then used to extrapolate the vertical seismic profiling upgoing wavefield data to the surface.

The derived Green's functions for the individual surface locations are then convolved with upgoing wavefields of the seismic energy from the surface locations sensed by the individual receivers. The derived Green's functions for the individual receivers are also cross-correlated with downgoing wavefields of the seismic energy emitted from other surface locations.

The results of processing steps of convolving and cross-correlating for the individual surface locations are then assembled to form VSP-CMP gathers for the individual surface locations of the responses of subsurface earth formations to the emitted seismic energy. The formed VSP-CMP gathers can then processed to obtain information of interest about the subsurface formations, and an output display formed of the processed VSP-CMP gathers.

The present invention also provides a new and improved data processing system for vertical seismic profiling survey data in the form of responses sensed by receivers in a wellbore to seismic energy travelling through subsurface earth formations from seismic sources at surface locations on the surface. The data processing system includes a data storage memory storing records of the vertical seismic profiling data. The data processing system also includes a processor which assembles for the individual surface locations the responses of the subsurface earth formations: to direct arrivals of seismic energy from the surface locations to the individual receivers, to upgoing wavefields of the seismic energy from the surface locations, and to downgoing wavefields of the seismic energy from the surface locations.

The processor also derives from the direct arrivals of seismic energy in the vertical seismic profiling survey measured Green's function for individual surface locations. The Green's function for an individual surface location contains the required wave amplitude and travel time information needed for the extrapolation of the vertical seismic profiling survey data from individual wellbore receivers to the individual surface locations.

The processor also convolves the measured Green's functions for the individual surface locations with upgoing wavefields of the seismic energy from other surface locations, and cross-correlates the measured Green's functions for the individual surface locations with downgoing wavefields of the seismic energy from other surface locations.

The processor also assembles the results of convolving and cross-correlating for the individual surface locations to form VSP-CMP gathers for the individual surface locations of the responses of subsurface earth formations to the emitted seismic energy, and processes the formed VSP-CMP gathers to obtain information about the subsurface formations. A display of the processing system forms an output display of the processed VSP-CMP gathers.

The present invention also provides a new and improved data storage device having stored in a non-transitory computer readable medium computer operable instructions for causing a data processing system to process vertical seismic profiling survey data in the form of responses sensed by receivers in a wellbore to seismic energy travelling through subsurface earth formations from seismic sources at surface locations on the surface. The instructions stored in the data storage device cause the data processing system to assemble the vertical seismic profiling survey data in the computer to form records for the individual receivers of the responses of the subsurface earth formations: to direct arrivals of seismic energy from the surface locations to the individual receivers, to upgoing wavefields of the seismic energy from the surface locations, and to downgoing wavefields of the seismic energy from the surface locations.

The instructions stored in the data storage device also include instructions causing the data processing system to derive from direct arrivals in the vertical seismic profiling survey the measured Green's function for individual surface locations. The Green's function for an individual surface location contains the required wave amplitude and travel time information needed to extrapolate the vertical seismic profiling survey data from individual wellbore receivers to the individual surface location.

The instructions stored in the data storage device also include instructions causing the data processing system to convolve the derived Green's functions for the individual surface locations with upgoing wavefields of the seismic energy emitted from other surface locations, and to cross-correlate the derived Green's functions for the individual receivers with downgoing wavefields of the seismic energy from other surface locations.

The instructions stored in the data storage device also include instructions causing the data processing system to assemble the results of convolving and cross-correlating for the individual surface locations to form VSP-CMP gathers for the individual surface locations of the responses of subsurface earth formations to the emitted seismic energy, to process the formed VSP-CMP gathers to obtain information about the subsurface formations, and form an output display of the processed VSP-CMP gathers.

BRIEF DESCRIPTION OF THE DRAWINGS

FIGS. 4A, 4B, 4C and 4D are example plots of data gathers generated by wavefield extrapolation of vertical seismic profiling data according to the present invention.

DETAILED DESCRIPTION OF THE PREFERRED EMBODIMENTS

Figure 1:
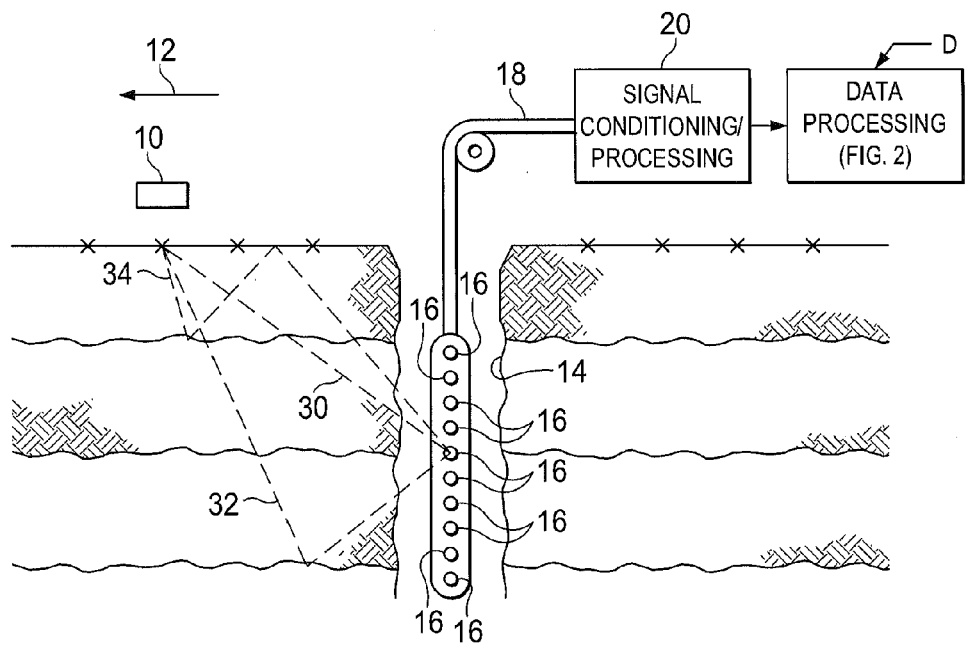
FIG. 1 is a schematic diagram of a vertical seismic profiling or VSP seismic survey according to the present invention.

In the drawings, FIG. 1 illustrates a simplified vertical seismic profiling or VSP seismic survey for acquisition of VSP data for computer processing according to the present invention. A seismic energy source such as a seismic vibrator 10 is shown deployed on the earth's surface at one of a number of source locations indicated by the symbol x. The source locations x are typically arranged along a seismic line of profile indicated by an arrow 12 extending across the surface on either side of a wellbore 14 formed in the earth and extending through subsurface formations of interest for the presence of hydrocarbons. During what is known as a walkaway vertical seismic profiling survey, seismic energy is emitted several times from the source 10 at an initial one of the survey locations nearest the wellbore 14. The response of subsurface formation to each such seismic energy emission is then detected in the form of VSP seismic data by a suitable number of seismic receivers or sensors 16 which are shown deployed downhole in the wellbore 14.

The seismic receivers 16 are of the conventional type available from several suppliers. The seismic receivers are deployed at a desired depth in wellbore 14 and connected by signal transfer conductors in a wireline cable 18 to surface processing electronics 20 for signal conditioning and formatting processing for transfer to a data processing system D. The surface processing electronics 20 includes recording media to make records of the VSP seismic data obtained by the seismic receivers 16. The data processing system D which is shown in more detail in FIG. 2 processes the VSP data, as will be set forth.

The source then moves to the next of a succession of source locations x at an increasing distance from the wellbore 14, and the source 10 then produces another sequence of energy emissions, with the sensors being moved to a set of desired depths as has been described. The foregoing sequence is repeated for each of a number of source locations x according to the survey plan.

The recorded VSP survey data is in the form of a series of seismic signals representing the response of subsurface formations to the travel of seismic energy through them. Portions of the seismic energy from each of its source emissions pass directly through the geologic subsurface from the source location x to the sensors as indicated at 30 in the form of what are known as direct arrivals. Other portions of the seismic energy emitted from the source 10 travel through subsurface formations and are reflected by interfaces between different rock lithologies of adjacent subsurface formations to travel to the sensors 16, as indicated at 32, forming what are known as upgoing wavefields. Still other portions of the seismic emitted by the source 10 do not travel from a first reflection, but are reflected more than one time by subsurface interfaces before arrival at the sensors, as indicated at 34, forming what are known as downgoing wavefields.

Figure 2:
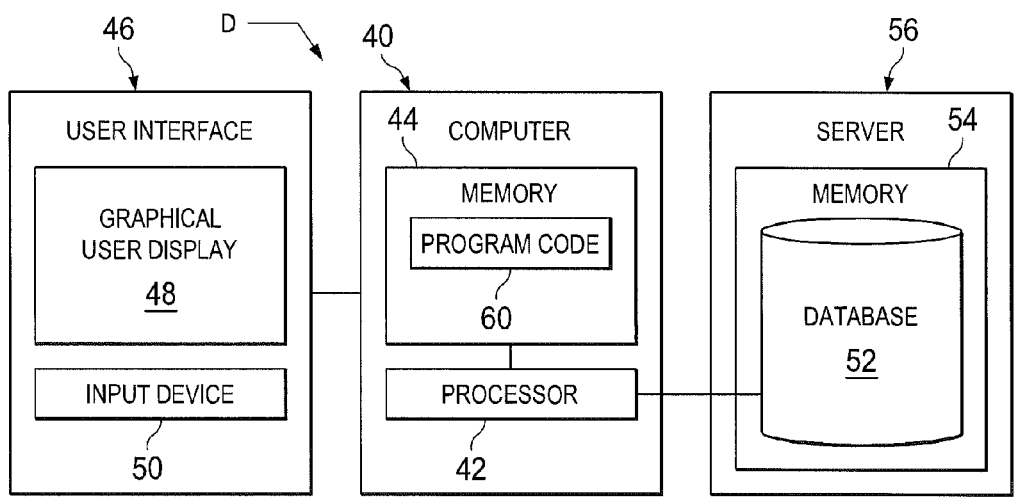
FIG. 2 is a schematic block diagram of a data processing system for generating VSP-CMP gathers by wavefield extrapolation from vertical seismic profile data according to the present invention.

As illustrated in FIG. 2, the data processing system D includes the computer 40 having a processor 42, and memory 44 coupled to the processor 42 to store operating instructions, control information and database records therein. The computer 40 may, if desired, be a multicore processor with nodes such as those from HP, Intel Corporation or Advanced Micro Devices (AMD). The computer 40 may also be a mainframe computer of any conventional type of suitable processing capacity such as those available from International Business Machines (IBM) of Armonk, N.Y. or other source. As noted below, other digital processors may also be used, as well. It should be noted that other digital processors, may be used, such as personal computers in the form of a laptop computer, notebook computer or other suitable programmed or programmable digital data processing apparatus.

The computer 40 is typically in the form of a computer having a user interface 46 and an output display 48 for displaying output data or records of processing of seismic data measurements performed according to the present invention. The output display 48 includes components such as a printer and an output display screen capable of providing printed output information or visible displays in the form of graphs, data sheets, graphical images, data plots and the like as output records or images.

The user interface 46 of computer 40 also includes a suitable user input device or input/output control unit 50 to provide a user access to control or access information and database records and operate the computer 40. Data processing system D further includes a database 52 stored in memory, which may be internal memory 44, or an external, networked, or non-networked memory as indicated at 54 in an associated database server 56.

The data processing system D includes program code 60 stored in memory 44 of the computer 40. The program code 60, according to the present invention is in the form of computer operable instructions causing the data processor 42 for wavefield extrapolation from pre-stack vertical seismic profile data according to the present invention.

It should be noted that program code 60 may be in the form of microcode, programs, routines, or symbolic computer operable languages that provide a specific set of ordered operations that control the functioning of the data processing system D and direct its operation. The instructions of program code 60 may be may be stored in non-transitory memory 44 of the computer 40, or on computer diskette, magnetic tape, conventional hard disk drive, electronic read-only memory, optical storage device, or other appropriate data storage device having a non-transitory computer usable medium stored thereon. Program code 60 may also be contained on a data storage device such as server 56 as a computer readable medium, as shown.

Figure 3:
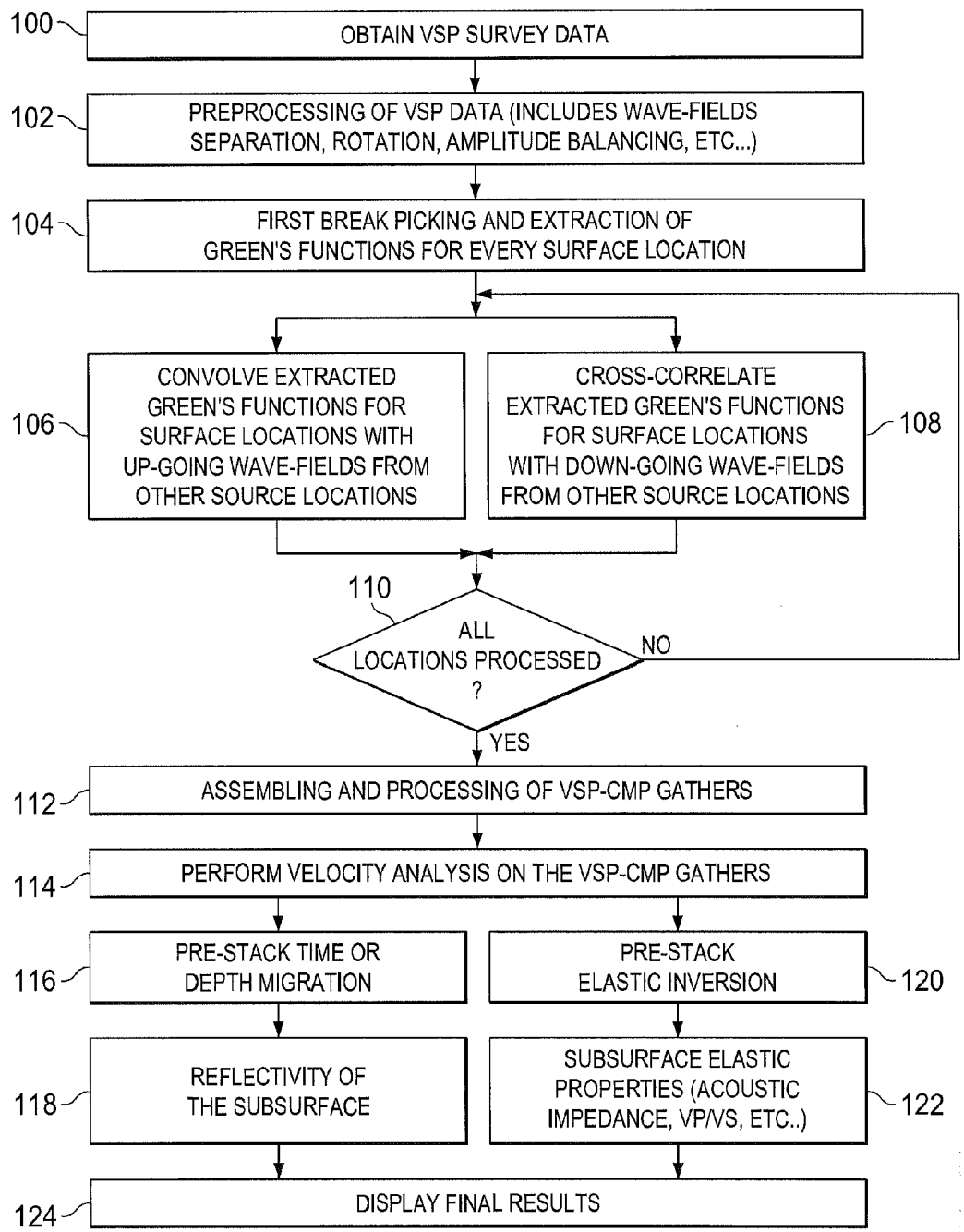
FIG. 3 is a functional block diagram of a set of data processing steps performed in a data processing system for generating VSP-CMP gathers by wavefield extrapolation of the vertical seismic profile data according to the present invention.

FIG. 3 illustrates the computer implemented methodology or process of processing vertical seismic profiling survey data to extrapolate wavefields. The vertical seismic profiling data are obtained as indicated at step 100 in the form of responses sensed by the sensors or receivers 16 in the wellbore 14 to seismic energy travelling through subsurface earth formations from seismic sources 10 at source locations x on the surface along a line of profile in the manner described above with respect to FIG. 1.

During step 102, the vertical seismic profiling survey data from step 100 are pre-processed to form records for the individual receivers 16 of the responses of the subsurface earth formations: to direct arrivals of seismic energy of the type shown at 30 from the source locations x to the individual receivers, to upgoing wavefields of the type shown at 32 of the seismic energy from the source locations, and to downgoing multiple wavefields of the type shown at 34 of the seismic energy from the source locations. The data assembled during step 102 are stored in either the database 52 or memory 44 of the data processing system and are available for display, as well.

During step 104, the measured Green's function G ($x_{rcv}$, t) is extracted from the vertical seismic profiling survey data for the individual receivers from direct arrivals of seismic energy from the source locations to the individual receivers 16. Due to the seismic principle of reciprocity, the direct arrivals obtained in such survey data can equally be considered to represent seismic energy from the same position as a receiver location in the wellbore to surface position x where a source is located. The Green's function G ($x_{rcv}$, t) resulting from step 104 for an individual surface location x thus represents a wave amplitude and travel time to extrapolate the vertical seismic profiling survey data from positions at individual wellbore receivers 16 to that particular surface location x.

A suitable method of extracting the Green's function from the direct waves is by extracting the seismic wavelets measured in VSP downgoing wavefield within a window a 50-60 milliseconds window around the first break arrival time. It should be understood, however, that other techniques may also be used, if desired.

During step 106, the computer processor 42 performs a convolution operation of the derived Green's functions G $X_{rcv}$, t) resulting from step 104 for the individual surface locations x with data representing upgoing wavefields of the type shown at 32 (FIG. 1) assembled during step 102. The derived Green's functions $G_{rcv}$ are thus employed, in a convolution process with the upgoing wavefield $P_{up}$, to extrapolate the data measured in the borehole to surface receiver locations according to the following relationship:

$$P_{extrp}(x_{src}, x_{rcv}, t) = \Sigma P_{up}(x_{src}, t) * G(x_{rcv}, t) \quad (1)$$

As indicated by Equation (1), the upgoing wavefield $P_{up}$ from a shot gather $x_{src}$ at one side of the wellbore 14 is convolved, trace by trace with the Green's functions G ($x_{rcv}$, t) at the opposite side of the wellbore 14. Further, a summation of the resultant convolved traces is performed as indicated by Equation (1) to produce a true extrapolated wave $P_{extrp}$ with the source and receiver at the surface.

During step 108, the computer processor 42 performs a cross-correlation of the derived Green's functions G ($x_{rcv}$, t) for the individual receivers resulting from step 104 with data representing downgoing wavefields of the type shown at 34 (FIG. 1) assembled during step 102. The derived Green's functions $G_{rcv}$ are thus employed, in a cross-correlation process with the downgoing wavefields $P_{down}$, to extrapolate the data measured in the borehole to surface receiver locations according to the following relationship:

$$P_{extrp}(x_{src}, x_{rcv}, t) = \Sigma P_{down}(x_{src}, t) \otimes G(x_{rcv}, t) \quad (2)$$

As indicated in Equation (2), the downgoing wavefields from surface locations x are cross-correlated in a cross-correlation operation between the downgoing wavefield from a shot gather and the Green's function from another shot gather at the same side of the well. This processing extends the lateral coverage of the vertical seismic profiling survey.

During step 110, a determination is made whether the data for all receivers and sources has been processed. If not, processing returns to step 106 and the computer 40 continues performance of steps 106 and 108. If during step 110 it is determined that data for all receivers and sources has been processed, processing proceeds to step 112. (FIG. 3B)

During step 112, the results of processing steps 106 and 108 are assembled as seismic data gathers in the form of vertical seismic profiling-common midpoint (VSP-CMP) gathers for each of the surface locations.

The resulting extrapolated wavefield data for each surface location x represents data that would have been recorded at a surface receiver at that location x. The extrapolated wavefield data includes the kinematic and dynamic effects of the wavefield propagation. The resultant VSP-CMP gathers can be processed to generate an image or physical parameters of the subsurface.

As indicated in FIG. 3B, the resultant gathers are processed in the computer 40 in a variety of ways according to the type analysis desired or required of subsurface formation structure. During step 114, the VSP-CMP gathers are processed in computer 40 with a velocity analysis being performed on the gathers. During step 116, the gathers are the subject of a pre-stack time or depth migration. The pre-stack time or depth migrated gathers from step 116 are processed during step 118 by forming a measure of subsurface reflectivity of the subsurface earth formations. An example of subsurface reflectivity determination is presented in an article by Applicant B. El Marhfoul et. al, 2011, "VSP Imaging by Wavefield Extrapolation Techniques", Borehole Geophysics Workshop—Emphasis on 3D VSP, EAGE, Expanded Abstracts.

During step 120, the gathers from step 114 are the subject of pre-stack elastic inversion. Another type of processing which can be performed during step 114 is An example of processing during step 120 is described in an article by Jawwad Ahmad et al., 2011, 'Pre-stack VSP Elastic Inversion for Lithology Delineation in an Offshore Field of the Arabian Gulf, Saudi Arabia", 2011, Borehole Geophysics Workshop—Emphasis on 3D VSP", EAGE, Expanded.

During step 122, the data resulting from step 120 are processed by forming a measure of elastic parameters of the subsurface earth formations, such as acoustic impedance, and ratio of pressure wave velocity $V_p$ to shear wave velocity $V_s$. Another type of processing performed in step 122 is forming a measure of amplitude variations with offset of the subsurface earth formations, as described for example in "Hydrocarbon Detection With AVO", Oilfield Review, Vol. 5, No. 1, pp. 42-50 (January 1993).

During step 124, the processing results from steps 118 and 122 are stored in suitable memory of the data processing system D and displayed or plotted as required on display 48. FIGS. 4A, 4B, 4C and 4D are example plots of VSP-CMP gathers generated from processing data according to the present invention. Specifically, the plots of FIGS. 4A through 4D are data obtained from conversion of the upgoing and downgoing wavefields into pseudo-surface seismic data in the manner described above. In the plots of FIGS. 4A through 4D, hyperbolic moveout can be observed in the events present in the data. This indicates the data generated is similar in format and content to actual surface seismic data.

Accordingly, it can be seen that with the present invention, vertical seismic wavefield extrapolation is performed, converting upgoing and downgoing wavefields from VSP data into pseudo common mid-point gathers (VSP-CMP). The relative amplitudes and superior quality of the VSP data are preserved. This is accomplished using measured Green's functions obtained from the VSP data in terms of amplitudes and times. The Green's functions are derived from the walkaway VSP data from all surface source functions to all receiver locations in the well.

The measured Green's functions are then used in a convolution process to extrapolate the data measured in the borehole to receiver locations. The same Green's functions are used in a cross-correlation process with the downgoing multiples wavefield to extend the lateral coverage of the VSP image. The resultant VSP-CMP gathers form an image of the subsurface and are then subjected to inversion processing to extract physical parameters of interest regarding the subsurface, such as acoustic impedance, and ratio of pressure wave velocity $V_p$ to shear wave velocity $V_s$.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined processing methodology, or in the utilization of the results thereof, requires the claimed matter in the following claims; such modifications shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of processing vertical seismic profiling survey data in the form of responses sensed by receivers in a wellbore to seismic energy travelling through subsurface earth formations from seismic sources deployed at individual source locations along a seismic line of profile extending on either side of the wellbore at surface locations on the earth to form vertical seismic profile common midpoint gathers for the surface source locations and obtain information about the subsurface earth formations, comprising the computer implemented processing steps of:

(a) assembling the vertical seismic profiling survey data in the computer to form records for the individual well-bore receivers of the responses of the subsurface earth formations to seismic energy in the form of:
  (1) direct arrivals of seismic energy from the surface locations to the individual well bore receivers;
  (2) upgoing wavefields of the seismic energy from the surface locations; and
  (3) downgoing wavefields of the seismic energy from the surface locations;
(b) deriving a Green's function for each individual source location in the vertical seismic profiling survey from the direct arrivals of seismic energy at the individual wellbore receivers from the sources at the source locations of the vertical seismic profiling survey;
(c) the Green's function each individual source location representing a wave amplitude and travel time to extrapolate the vertical seismic profiling survey data from individual wellbore receivers to that individual source location;
(d) convolving the derived Green's functions for each individual source location with the upgoing wavefields of the seismic energy emitted from the sources at the surface locations on an opposite side of the wellbore from the individual source surface locations to form a resultant convolved trace;
(e) cross-correlating the derived Green's functions for each individual source location with the downgoing wavefields of the seismic energy emitted from the sources at the surface locations on the same side of the well as the individual source surface locations to extend lateral coverage of the vertical profiling survey;
(f) assembling as seismic data gathers for the individual source surface locations the results of the processing steps of convolving and cross-correlating for the individual surface locations;
(g) the assembled seismic data gathers forming vertical seismic profiling-common midpoint gathers for the individual surface locations of the responses of subsurface earth formations to the emitted seismic energy;
(h) the vertical seismic profiling-common midpoint gathers forming for each of the individual source surface locations an extrapolated wavefield including the kinematic and dynamic effects of wavefield propagation at each such individual source surface location;
(i) processing the formed vertical seismic profiling-common midpoint gathers for the source locations to generate a physical parameter of the subsurface earth formations; and
(j) forming an output display of the generated physical parameter of the subsurface earth formations obtained from the processed vertical seismic profiling-common midpoint gathers.

2. The computer implemented method of claim 1, further including the step of:
storing the assembled seismic data gathers.

3. The computer implemented method of claim 1, further including the step of:
forming an output display of the assembled seismic survey data gathers.

4. The computer implemented method of claim 1, wherein the step of processing the formed vertical seismic profiling-common midpoint gathers to generate a physical parameter comprises the step of:
forming a measure of subsurface reflectivity of the subsurface earth formations.

5. The computer implemented method of claim 1, wherein the step of processing the formed vertical seismic profiling-common midpoint gathers to generate a physical parameter comprises the step of:
forming a measure of elastic parameters of the subsurface earth formations.

6. The computer implemented method of claim 1, wherein the step of processing the formed vertical seismic profiling-common midpoint gathers to generate a physical parameter comprises the step of:
forming a measure of seismic attributes of the subsurface earth formations.

7. The computer implemented method of claim 1, wherein the step of processing the formed vertical seismic profiling-common midpoint gathers to generate a physical parameter comprises the step of:
forming a measure of amplitude variations with offset of the subsurface earth formations.

8. The computer implemented method of claim 1, further including the step of:
summing the resultant convolved traces for the individual source locations from the step of convolving to produce an extrapolated wave.

9. A data processing system for vertical seismic profiling survey data in the form of responses sensed by receivers in a wellbore to seismic energy travelling through subsurface earth formations from seismic sources deployed at individual source locations along a seismic line of profile extending on either side of the wellbore at surface locations on the earth to form vertical seismic profile common midpoint gathers for the surface source locations and obtain information about the subsurface earth formations, the data processing system comprising:
a data storage memory storing records of the vertical seismic profiling data;
a processor for performing the steps of:
(a) assembling for the individual wellbore receivers of the responses of the subsurface earth formations to seismic energy in the form of:
(1) direct arrivals of seismic energy from the surface locations to the individual wellbore receivers;
(2) upgoing wavefields of the seismic energy from the surface locations; and
(3) downgoing wavefields of the seismic energy from the surface locations;
(b) deriving a Green's function for each individual source location in the vertical profiling survey from the direct arrivals of seismic energy at the individual wellbore receivers from the sources at the source locations of the vertical seismic profiling survey;
(c) the Green's function for each individual source location representing a wave amplitude and travel time to extrapolate the vertical seismic profiling survey data from individual wellbore receivers to that individual source location;
(d) convolving the derived Green's functions for each individual source location with upgoing wavefields of the seismic energy emitted from other surface locations on an opposite side of the wellbore from the individual source surface locations to form a resultant convolved trace;
(e) cross-correlating the derived Green's functions for each individual source locations with the downgoing wavefields of the seismic energy emitted from the sources at the surface locations on the same side of the well as the individual source surface locations to extend lateral coverage of the vertical profiling survey;
(f) assembling as seismic data gathers for the individual source surface locations the results of the processing steps of convolving and cross-correlating for the individual surface locations;
(g) the assembled data gathers forming vertical seismic profiling-common midpoint gathers for the individual surface locations of the responses of subsurface earth formations to the emitted seismic energy;
(h) the vertical seismic profiling-common midpoint gathers forming for each of the individual source surface locations an extrapolated wavefield including the kinematic and dynamic effects of wavefield propagation at each such individual source surface location; and
(f) processing the formed vertical seismic profiling-common midpoint gathers for the surface locations to generate a physical parameter of the subsurface formations; and
a display forming an output display of the generated physical parameter of the subsurface earth formations obtained from the processed vertical seismic profiling-common midpoint gathers.

10. The data processing system of claim 9, wherein the processor further performs the steps of:
storing the assembled seismic data gathers.

11. The data processing system of claim 10, wherein the processor further performs the step of:
summing the resultant convolved traces for the individual source locations resulting from the step of convolving to produce an extrapolated wave.

12. The data processing system of claim 9, wherein the processor further performs the steps of:
forming an output display of the assembled seismic data gathers.

13. The data processing system of claim 9, wherein the processor in performing the step of processing the formed vertical seismic profiling-common midpoint gathers to generate a physical parameter performs the steps of:
forming a measure of subsurface reflectivity of the subsurface earth formations.

14. The data processing system of claim 9, wherein the processor in performing the step of processing the formed vertical seismic profiling-common midpoint gathers to generate a physical parameter performs the steps of:
forming a measure of elastic parameters of the subsurface earth formations.

15. The data processing system of claim 9, wherein the processor in performing the step of processing the formed vertical seismic profiling-common midpoint gathers to generate a physical parameter performs the steps of:
forming a measure of seismic attributes of the subsurface earth formations.

16. The data processing system of claim 9, wherein the processor in performing the step of processing the assembled vertical seismic profiling-common midpoint gathers to generate a physical parameter performs the steps of:
forming a measure of amplitude variations with offset of the subsurface earth formations.

17. A data storage device having stored in a non-transitory computer readable medium computer operable instructions for causing a data processing system to process vertical seismic profiling survey data in the form of responses sensed by receivers in a wellbore to seismic energy travelling through subsurface earth formations from seismic sources deployed at individual source locations along a seismic line of profile extending on either side of the wellbore at surface locations on the earth to form vertical seismic profile common midpoint gathers for the surface source locations and obtain information about the subsurface earth formations, the instructions stored in the data storage device causing the data processing system to perform the following steps:

(a) assembling the vertical seismic profiling survey data in the computer to form records for the individual wellbore receivers of the responses of the subsurface earth formations to seismic energy in the form of:
  (1) direct arrivals of seismic energy from the surface locations to the individual well bore receivers;
  (2) upgoing wavefields of the seismic energy from the surface locations; and
  (3) downgoing wavefields of the seismic energy from the surface locations;
(b) deriving a Green's function for each individual source locations in the vertical profiling survey from the direct arrivals of seismic energy at the individual wellbore receivers from the sources at the source locations of the vertical seismic profiling survey;
(c) the Green's function for each individual source location representing a wave amplitude and travel time to extrapolate the vertical seismic profiling survey data from individual wellbore receivers to that individual source location;
(d) convolving the derived Green's functions for each of the individual source locations with the upgoing wavefields of the seismic energy emitted from the sources at the surface locations on an opposite side of the wellbore from the individual source surface locations to form a resultant convolved trace;
(e) cross-correlating the derived Green's functions for each individual source location with the downgoing wavefields of the seismic energy emitted from the sources at the surface locations on the same side of the well as the individual source surface locations to extend lateral coverage of the vertical profiling survey;
(f) assembling as seismic data gathers for the individual source surface locations the results of the processing steps of convolving and cross-correlating for the individual surface locations;
(g) the assembled seismic data gathers forming vertical seismic profiling-common midpoint gathers for the individual surface locations of the responses of subsurface earth formations to the emitted seismic energy;
(h) the vertical seismic profiling-common midpoint gathers forming for each of the individual source surface locations an extrapolated wavefield including the kinematic and dynamic effects of wavefield propagation at each such individual source surface location;
(i) processing the formed vertical seismic profiling-common midpoint gathers for the source locations to generate a physical parameter of the subsurface earth formations; and
(g) forming an output display of the generated physical parameters of the subsurface earth formations obtained from the processed vertical seismic profiling-common midpoint gathers.

18. The data storage device of claim 17, wherein the instructions further include instructions causing the data processing system to perform the step of:
storing the assembled seismic data gathers.

19. The data storage device of claim 17, wherein the instructions further include instructions causing the data processing system to perform the step of:
forming an output display of the assembled seismic data gathers.

20. The data storage device of claim 17, wherein the processing instructions further include instructions causing the data processing system to perform the step of:
forming a measure of subsurface reflectivity of the subsurface earth formations.

21. The data storage device of claim 17, wherein the processing instructions further include instructions causing the data processing system to perform the step of:
forming a measure of elastic parameters of the subsurface earth formations.

22. The data storage device of claim 17, wherein the processing instructions further include instructions causing the data processing system to perform the step of:
forming a measure of seismic attributes of the subsurface earth formations.

23. The data storage device of claim 17, wherein the processing instructions further include instructions causing the data processing system to perform the step of:
forming a measure of amplitude variations with offset of the subsurface earth formations.

24. The data storage device of claim 17, wherein the instructions further include instructions causing the data processing system to perform the step of:
summing the resultant convolved traces for the individual source locations resulting from the step of convolving to produce an extrapolated wave.

* * * * *